(No Model.)
A. F. LABRIE.
CLOTHES LINE HOLDER.
No. 467,178.
Patented Jan. 19, 1892.
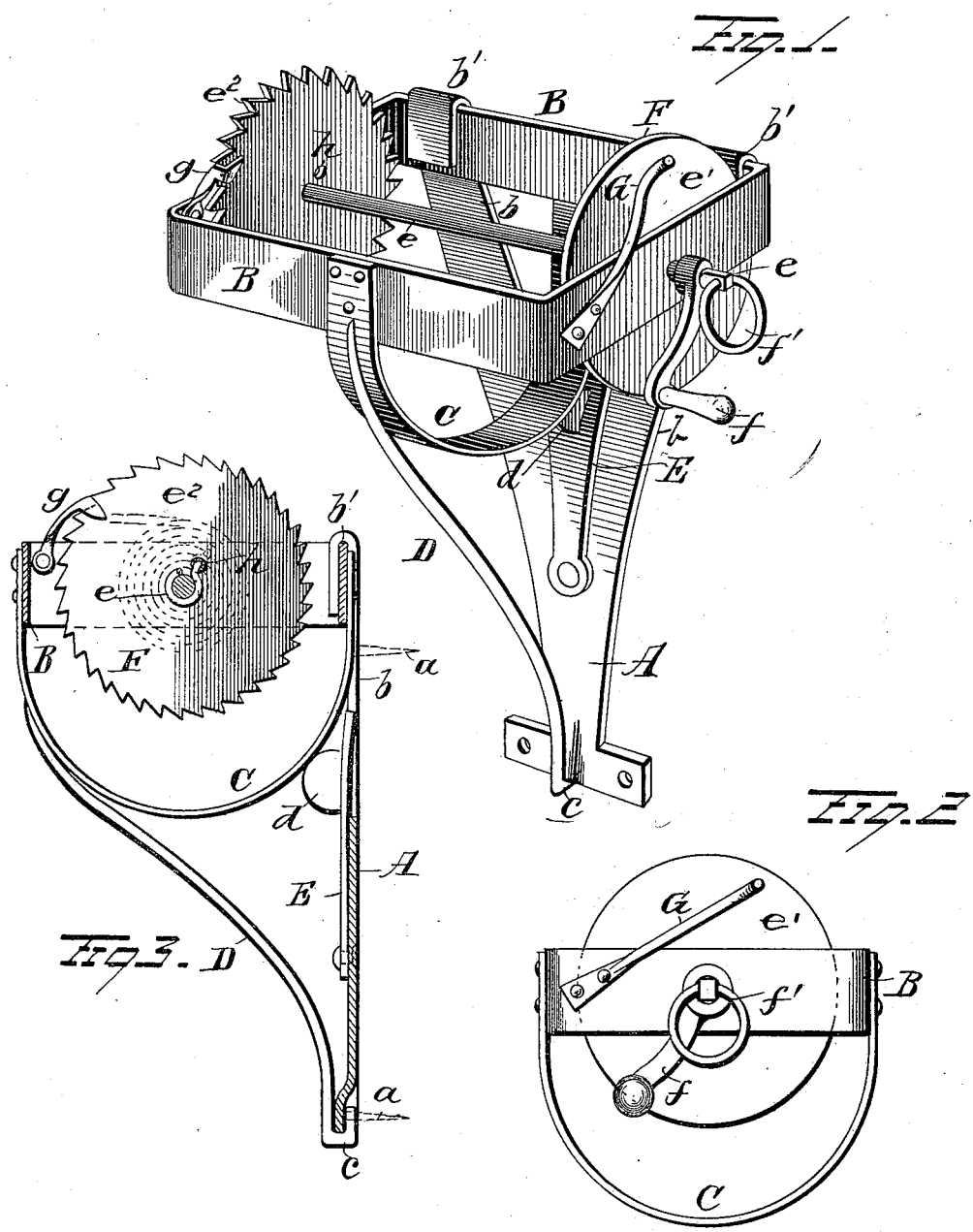
Witnesses
E. Nottingham
Ll. Nottingham
Inventor
A. F. Labrie
By H. A. Seymour
Attorney

UNITED STATES PATENT OFFICE.

ANATOLE F. LABRIE, OF REDFIELD, SOUTH DAKOTA.

CLOTHES-LINE HOLDER.

SPECIFICATION forming part of Letters Patent No. 467,178, dated January 19, 1892.

Application filed May 5, 1891. Serial No. 391,637. (No model.)

*To all whom it may concern:*

Be it known that I, ANATOLE F. LABRIE, a citizen of Redfield, in the county of Spink and State of South Dakota, have invented certain new and useful Improvements in Clothes-Line Holders; and I do hereby declare the following to be a full, clear, and exact description of the invention, such as will enable others skilled in the art to which it appertains to make and use the same.

My invention relates to an improvement in clothes-line holders.

The invention consists in certain novel features of construction and combinations and arrangement of parts, as hereinafter set forth, and pointed out in the claims.

In the accompanying drawings, Figure 1 is a perspective view of my improvements. Fig. 2 is a side elevation of the same. Fig. 3 is a sectional view.

A represents a bracket adapted to be secured to the side of a house, a post, or other convenient place by means of suitable fastening devices $a$, said plate or bracket being made with arms $b$, the free ends of which are turned up or folded upon themselves to produce hooks or bearings $b'$ for the reception of a frame B. The frame B is made of suitable material and preferably of rectangular form. The front and rear bars or sides of the frame B are connected by a semicircular brace C, to which a downwardly-extending spring-arm or brace-rod D is secured, the free end of said spring-arm or brace-rod being made with a hook $c$, adapted to enter a recess or depression made in the lower end of the bracket A, and thereby assist in holding or sustaining the weight of the device and hold the device rigid. An arm E is pivotally connected to the bracket A and provided on its outer face with a lug or projection $d$, said arm E being adapted to be swung around under the frame B to hold the device from slipping out of the hooks B', and the lug or projection $d$ being also adapted to act as a thumb-piece to swing arm E. Mounted in the rectangular frame B is a reel F, said reel consisting of a shaft $e$, disk $e'$, and ratchet-wheel $e^2$. The shaft $e$ is extended somewhat beyond its bearings and provided with a crank or handle $f$, by means of which to operate it. A ring $f'$ may also be connected with the end of said shaft, whereby to hang the device up when not in use. A spring-brake G is secured at one end to the frame, and at the other end adapted to make frictional contact with one face of the disk $e'$, and it is preferable that this brake be secured to the frame by means of bolts. By securing the friction-brake to the frame by means of bolts it may be readily removed should it get broken. A dog $g$ is pivotally connected to the frame B and adapted to be made to engage the ratchet-wheel $e^2$. By this latter arrangement it will be seen that when it is desired to tighten the line it is simply necessary to throw the dog into engagement with the ratchet-wheel, whereupon the reel will be prevented from turning, thereby permitting the line to be drawn tight. By providing the friction-brake the line will be prevented from unwinding from the reel too freely, and thus prevent said line from dragging on the ground. A perforation $h$ will preferably be made in one of the disks $e'$ or $e^2$, through which one end of the line to be reeled will be inserted and knotted, as shown in Fig. 3, thus preventing the escape of the line from the reel should it be necessary to employ the entire line at once.

By constructing the device as above set forth, when it is desired to wind the line on the reel it is simply necessary to remove the frame containing the reel from the bracket A and turn the reel, as the user walks toward the place where the other end of the line is fastened. The device, constructed and arranged as above set forth, is very simple in construction, easy and cheap to manufacture, and effectual in the performance of its functions.

Slight changes might be made in the details of construction of my invention without departing from the spirit thereof or limiting its scope. Hence I do not wish to restrict myself to the precise details of construction herein set forth; but, Having fully described my invention, what I claim as new, and desire to secure by Letters Patent, is—

1. The combination, with a bracket having arms provided with hooks at their ends, of a frame detachably held in said hooks, a spring-arm having a hook on one end connecting the frame with the bracket, a reel mounted in said frame, and means for locking the frame to the bracket, substantially as set forth.

2. The combination, with a bracket, of a frame mounted in one end of said bracket, a brace connecting the side bars of said frame, and a spring-arm secured at one end to said brace and adapted at its other end to engage the lower end of the bracket, substantially as set forth.

3. The combination, with a bracket, of a frame mounted in one end of said bracket, a brace connecting the side bars of the frame, a spring-arm secured at one end to the brace and adapted at its other end to engage the lower end of the bracket, and an arm connected to the bracket and adapted to engage the above-mentioned brace, substantially as set forth.

In testimony whereof I have signed this specification in the presence of two subscribing witnesses.

ANATOLE F. LABRIE.

Witnesses:
R. E. STERLING,
T. P. BLAIN.